United States Patent [19]

Palm et al.

[11] Patent Number: 5,366,640
[45] Date of Patent: Nov. 22, 1994

[54] CONVERSION OF PHOSPHORIC ACID WATERS

[76] Inventors: Gordon W. Palm, late of Lakeland; by Marcella W. Palm, Legal Representative; R. George Hartig, both of 2729 Oakland Ave., all of Lakeland, Fla. 33803

[21] Appl. No.: 120,331

[22] Filed: Sep. 14, 1993

Related U.S. Application Data

[63] Continuation-in-part of Ser. No. 782,989, Oct. 28, 1991, which is a continuation-in-part of Ser. No. 727,606, Jul. 9, 1991, abandoned.

[51] Int. Cl.⁵ .................................................. C02F 1/62
[52] U.S. Cl. .................................... 210/724; 210/726; 210/747; 210/912; 210/915; 423/320
[58] Field of Search ................ 423/321 R, 320, 319, 423/170, 490; 210/257.1, 542, 906, 907, 702, 918, 919, 921, 726, 747, 912, 915

[56] References Cited

U.S. PATENT DOCUMENTS 3,625,648 12/1971 Randolph ............................ 423/484
3,699,212 10/1972 Palm ................................... 423/319
4,320,012 3/1982 Palm et al. ....................... 423/321 R

OTHER PUBLICATIONS

Kirk–Othmer, *Encyclopedia of Chemical Technology*, Third Edition, vol. 24, John Wiley & Sons (1984), pp. 300–304.
Lund, H. F., ed, "Industrial Pollution Control Handbook", McGraw Hill; New York (1971), pp. 7-35, 7-36, 14-21, 14-22.

*Primary Examiner*—Wayne Langel
*Attorney, Agent, or Firm*—Charles A. McClure

[57] ABSTRACT

Converting wet-process phosphoric acid operations, to minimize and nearly eliminate discharge of contaminants to the environment, by generation, use, and treatment of new and unique process waters. Fluorides and other contaminants soluble under acidic conditions are insolubilized, and substantially all phosphoric acid is recovered. Acid pond water from conventional wet-process phosphoric acid manufacturing is replaced by neutralized gypsum stack water having a pH closely matching that of the surroundings. Both air and ground water contamination are reduced to essentially negligible levels.

7 Claims, 10 Drawing Sheets

FIG. 4

| DESCRIPTION | SYMBOL | pH LEVEL |
|---|---|---|
| SULFURIC ACID | | VERY ACIDIC |
| NEW POND WATER | | E.G. 1.5–2.0 |
| ACID PROCESS WATER | | |
| OLD POND WATER | | |
| SCRUBBER PROCESS WATER | | |
| FILTER WASH EFFLUENT | | |
| GYPSUM SLURRY | | |
| PARTLY NEUTD. SCRUBBER WATER | | MODERATELY ACIDIC |
| PARTLY NEUTD. SCRUBBER WATER UNDERFLOW | | E.G. 3.5–4.5 |
| PARTLY NEUTD. GYPSUM SLURRY | | |
| FLOCCULENT | | |
| LIMESTONE | | |
| LIMESTONE SLURRY | | |
| GYPSUM STACK WATER | | |
| pH-ADJUSTED WATER | | SLIGHTLY ACIDIC E.G. 6 |
| FRESH WATER & WATER VAPOR | | NEUTRAL |
| COOLING WATER | | E.G. 7 |
| STEAM | | |
| OVER-NEUTD. GYPSUM STACK WATER | | VERY ALKALINE |
| OVER-NEUTD. GYPSUM STACK WATER UNDERFLOW | | E.G. 11 |
| LIME | | |
| LIME SLURRY | | |

LEGEND

FIG. 8

CONVERSION OF PHOSPHORIC ACID WATERS

This is a continuation-in-part of our patent application Ser. No. 782,989 filed Oct. 28, 1991, pending which was a continuation-in-part of patent application Ser. No. 727,606 filed Jul. 9, 1991, abandoned, both of which are incorporated herein by this reference.

TECHNICAL FIELD

This invention relates to converting the contents of acid ponds produced by conventional wet-process phosphoric acid manufacturing from environmentally harmful or threatening to environmentally safe.

BACKGROUND OF THE INVENTION

Conventional manufacturing of wet-process phosphoric acid, as for fertilizer production, sets up extensive acid pond water cooling ponds and gypsum stacks, often measuring several hundred acres each. Authorities include A. V. Slack, ed. *Phosphoric Acid* (Decker 1968); and P. Becker *PHOSPHATES AND PHOSPHORIC ACID—Raw Materials, Technology, and Economics of the Wet Process* (Decker 1983), especially chapter 9 thereof, entitled "What to Do with Gypsum" (pp. 471–496).

Wherever in contact with the ground, resulting phosphate acid pond (or "gyp pond") waters pollute the ground and the ground water with residual phosphoric acid and soluble fluorides, also dissolved metal impurities and radioactive compounds. Underlying impermeable barriers are required to contain such pollutants, but impermeability over the long term is very difficult and expensive to sure. Regardless of the presence or effectiveness of an underlying barrier, gyp pond waters pollute the air by emitting fluoride-containing gases. The liquid itself is extremely acidic (pH from about 1.8–2.0), being composed of weak phosphoric acid ranging from 1.3–2.5% $P_2O_5$, fluosilicic and soluble fluorides ranging from 0.5–1.8%, sulfuric acid and soluble sulfates ranging from 0.5–1.6%, plus a number of soluble metal salts and radioactive compounds from the wet-process, all regarded by environmental authorities (and by us) as pollutants.

Attempts to limit the resulting contamination have had modest degrees of success, but acceptance of the ponds as a necessary evil has precluded comprehensive treatment of the underlying pollution, and fundamentally has precluded its satisfactory resolution. Hence, for the most part the attempts have been constrained or frustrated by the self-limiting condition that the acid ponds are here to stay.

Examples in U.S. patents include treatment of acid pond waters to remove metallic ions, as in Mills U.S. Pat. No. 4,303,532; to recover calcium fluoride, as in Hirka & Mills U.S. Pat. No. 4,171,342 or O'Neill U.S. Pat. No. 4,374,810; to remove calcium fluoride to enable use in wet ball-milling of phosphate rock, as in O'Neill et al. in U.S. Pat. No. 4,472,268; and to remove ammonia, as in Zibrida U.S. Pat. No. 4,698,163.

The present inventors, individually and jointly, have developed many improvements in the phosphate art, recognized in the following U.S. Pat. No. 3,699,212 (Palm); U.S. Pat. Nos. 3,720,757 and 3,859,423 (Hartig); and U.S. Pat. No. 4,320,012 (both). The latter joint patent teaches two-stage neutralization of such acid waters, with underflow from the second stage fed back into the first stage—contrary to a simpler two-stage treatment, as by Randolph in U.S. Pat. No. 3,625,648, for example.

More recently the present inventors developed the inventions of the applications identified above (whose priority is claimed here) to extend the benefits achieved by their previous two-stage modification of the wet-process, and thereby further reduce the loss of $P_2O_5$ in the process and further minimize the pollution attributable to wet-process operations. The present invention focuses primarily on converting accumulated acid pond waters, preferably in a setting of wet-processing modified by providing and circulating process water devoid of contaminants so as to supersede polluted acid pond waters.

SUMMARY OF THE INVENTION

A primary object of the present invention is to provide gradual or step-by-step conversion of conventional acid pond waters to harmless gypsum stack waters incident to discontinuation of conventional phosphate process acid (gypsum) pond waters and pollution hazards.

Another object of this invention is to rehabilitate existing gypsum stacks without need for more drastic environmental measures.

A further object of the invention is reduction of $P_2O_5$ losses in the process of manufacturing wet-process phosphoric acid.

In general, the objects of the present invention are attained by use of acidic process waters—not previously so used—and eliminating conventional phosphate process acid pond waters. Only neutralized gypsum stack waters (and a corresponding gypsum stack) reach the ground under (and air above) the new or converted pond.

A new pond is established to receive pond water neutralized to a pH of about 4.5. A transition pond is established to receive pond water and to feed its overflow into a segregated part of the pre-existing pond, to which is added more and more of the pre-existing pond area gradually until it is all converted.

The new acidic process waters result from aqueous collection of gaseous fluorides and entrained phosphoric acid, as by circulating water through flash coolers and evaporators condensers, and collection of $P_2O_5$ process leaks, spills, and wash liquid. Such acidic process waters are contained in process tanks, pipelines, and like equipment, being segregated from contact with external air, soil, and water unless and until being subsequently modified by partial neutralization to a moderate pH of about 4 to 4.5, or substantial neutralization to a nearly neutral pH in the vicinity of 6 to 7, adjusted to match surface waters. On the way it may be overneutralized to an alkaline condition.

Such new acid process waters are used for washing the filter cake, thereby supplying process water to the phosphoric acid reactor, and simultaneously recovering substantially all miscellaneous water-soluble $P_2O_5$ that is normally lost in conventional processing. Fluosilicic acid in the acid process water used to wash the filter cake reacts with phosphate rock, as in existing phosphoric acid reactors, to produce phosphoric acid, to precipitate fluorides, and to reduce consumption of sulfuric acid.

Gaseous fluorides collected from the reactor and other process equipment are captured by the scrubber process water, are treated appropriately, and are substantially removed by non-flocculent precipitation. Partially neutralized scrubber water at a pH of about 4.5 is useful for wet-rock grinding at the head-end of wet-processing of phosphoric acid.

The new gypsum stack is non-acidic and contains in precipitated form fluorides that otherwise might be in volatile aqueous solution along with calcium, heavy metals, and other contaminants.

Water draining from previously or newly formed gypsum stacks is also appropriately treated and utilized. Such gypsum stack water is freed of strong acid and soluble fluorides by partial neutralization. Upon being recirculated, a portion of it it is alkalized to remove silica, calcium, and heavy metals, producing a non-scaling pH-adjusted process water used for such purposes as filter wash, scrubber water make-up, cooling tower water make-up, acid process water make-up, limestone slurrying, and lime slaking and slurrying.

Other aspects of the present invention, together with means and methods for attaining the various objects, will be apparent from the following description and accompanying diagrams of preferred embodiments, which are presented by way of example rather than limitation.

It will be understood that starting with a non-polluting process is in some ways simpler than converting an existing plant from its polluting ways to substantial non-pollution. Accordingly, described first is improvement in the wet-process as prospectively applicable at a new location, where no wet-process phosphoric acid was ever manufactured. However, the description necessarily focuses upon the differences between conventional operation, on the one hand as exemplified by Becker, for example, and improved operation on the other hand, as exemplified here. Understanding such a non-transition situation is conducive to understanding corresponding modification of an existing wet-process plant. Then the steps required to transition an existing acid pond to environmentally acceptable condition will be readily understood by reference to description and drawings of at least one way of proceeding according to this invention. Most of the latter steps would also be useful if an existing plant were to be taken out of operation, whether temporarily or permanently.

SUMMARY OF THE DRAWINGS

FIG. 4 is a fourth schematic flow diagram, featuring gypsum stack water generation and treatment by this invention.

FIG. 8 is a LEGEND for the foregoing schematic diagrams.

DESCRIPTION OF THE INVENTION

Figure 1:
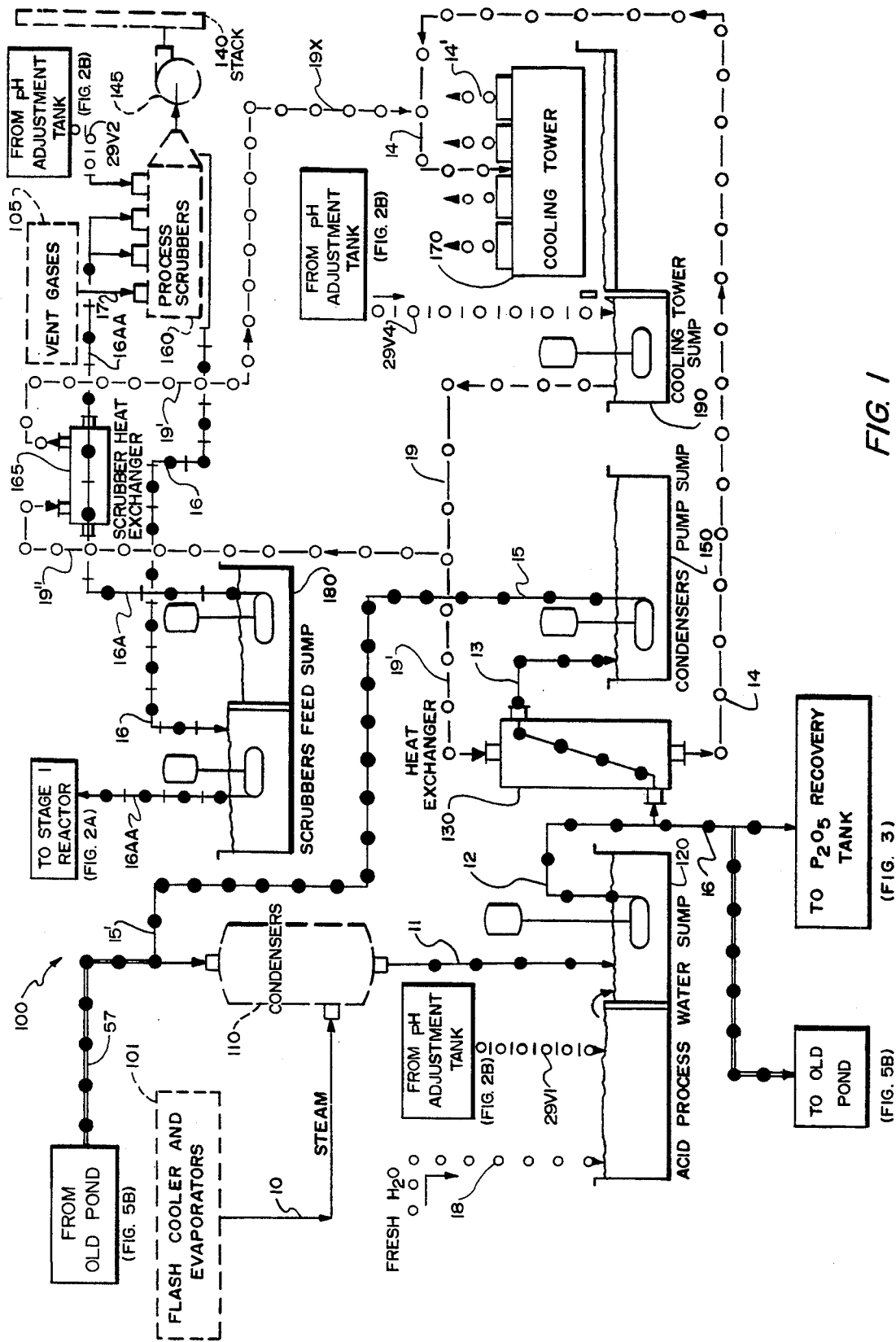
FIG. 1 is a first schematic diagram, featuring generation of acid process water and scrubber process water.

Some conventions or mnemonic aids are followed in the various diagrams, to render them more readily intelligible. For example, existing or conventional process components are usually represented in dashed outline, whereas other or new components are shown with a solid outline in block or other schematic form (usually double-lined for conversion items, at least when discussed as FIGS. 5A and 5B).

Components are identified by name and by 3-digit numbers, the first digit usually being the same as the Fig. number. Inflows and outflows indicated by iconographic lines identified in the LEGEND of FIG. 8 are identified by their respective interconnecting or transfer lines as two-digit numbers, usually the same as the first two digits of an interconnected component. Suffixes for such two-digit numbers include A ("above") for overflows and B ("below") for underflows, multiple where more than one; also X, Y, etc., for line extensions; and with appended or double primes for branches.

An item-by item description of all the diagrams precedes a description of the process as such, so as to minimize interruption of the diagram description by interjected process commentary—such as composition, concentration, phase, pH, and/or temperature—and to minimize reference characters in a subsequent process description.

FIG. 8—so numbered as a LEGEND rather than an apparatus or process diagram—provides a ready-reference diagrammatic guide to input and output water and other aqueous liquids, slurries, etc. under headings of Description, Symbol (iconographic), and pH Level.

The LEGEND is divided into five main horizontal sections, each comprising a number of rows under the identified headings. The row captions are Very Acidic (e.g., pH of 1.5–2) with seven entries; Moderately Acidic (e.g., pH of 3.5–4.5) seven entries; Slightly Acidic (pH about 6) one entry; Neutral (pH about 7) three entries; and Very Alkaline (e.g., pH of about 11) four entries.

Very acidic entries include Sulfuric Acid, double line; Acid Process Water, single line beaded with filled circles; Scrubber Process Water, single line, with filled circles and alternate cross-hatching; Filter Wash Effluent, dashed line, filled circles; Gypsum Slurry, single line with alternate filled circles and squares; plus double-lined conversion entries, Old Pond Water with filled circles, and New Pond Water with filled circles and alternating cross hatch.

Moderately Acidic entries are Partly Neutralized Scrubber Water, single line with filled circles and alternate double cross-hatching; Partly Neutralized Scrubber Water Underflow, single line with filled squares and alternate cross-hatching; Partly Neutralized Gypsum Slurry, single line with alternate filled squares and triangles; Flocculent, cross-hatching (without and with line); Limestone, filled triangles; Limestone slurry, single line with filled triangles and alternate cross-hatching; and Gypsum Stack Water, single line with open circles.

The only Slightly Acidic entry in FIG. 0 is pH-Adjusted Water, open circles and alternate cross-hatching.

Neutral entries are Fresh Water and Water Vapor, open circles (without line); Cooling Water, dashed line with open circles; and Steam (line only).

Very Alkaline entries are Over-Neutralized Gypsum Stack Water, single line with alternate open circles and cross-hatching; Over-Neutralized Gypsum Stack Water Underflow, single line with open squares; Lime, open triangles (no line); and Lime Slurry, single line with open triangles.

FIG. 1 shows schematically a first processing area, 100. STEAM containing gaseous fluorides and entrained phosphoric acid from phosphoric acid manufacture is fed via line 10 from FLASH COOLERS & EVAPORATORS 101 (dashed outline) such as common in phosphoric acid wet-process operations to CONDENSERS 110 (similarly dashed outline), where it is collected as acid process water via line 11 (beaded with filled circles) in ACID PROCESS WATER SUMP 120. Such acid process water circulates in substantial part via line 12 through HEAT EXCHANGER 130 and via line 13 to CONDENSERS PUMP SUMP 150, from which it is recycled via lines 15, 15' back to the condensers, and is discharged via line 11 from the CONDENSERS into ACID PROCESS SUMP 120.

Figure 2A:
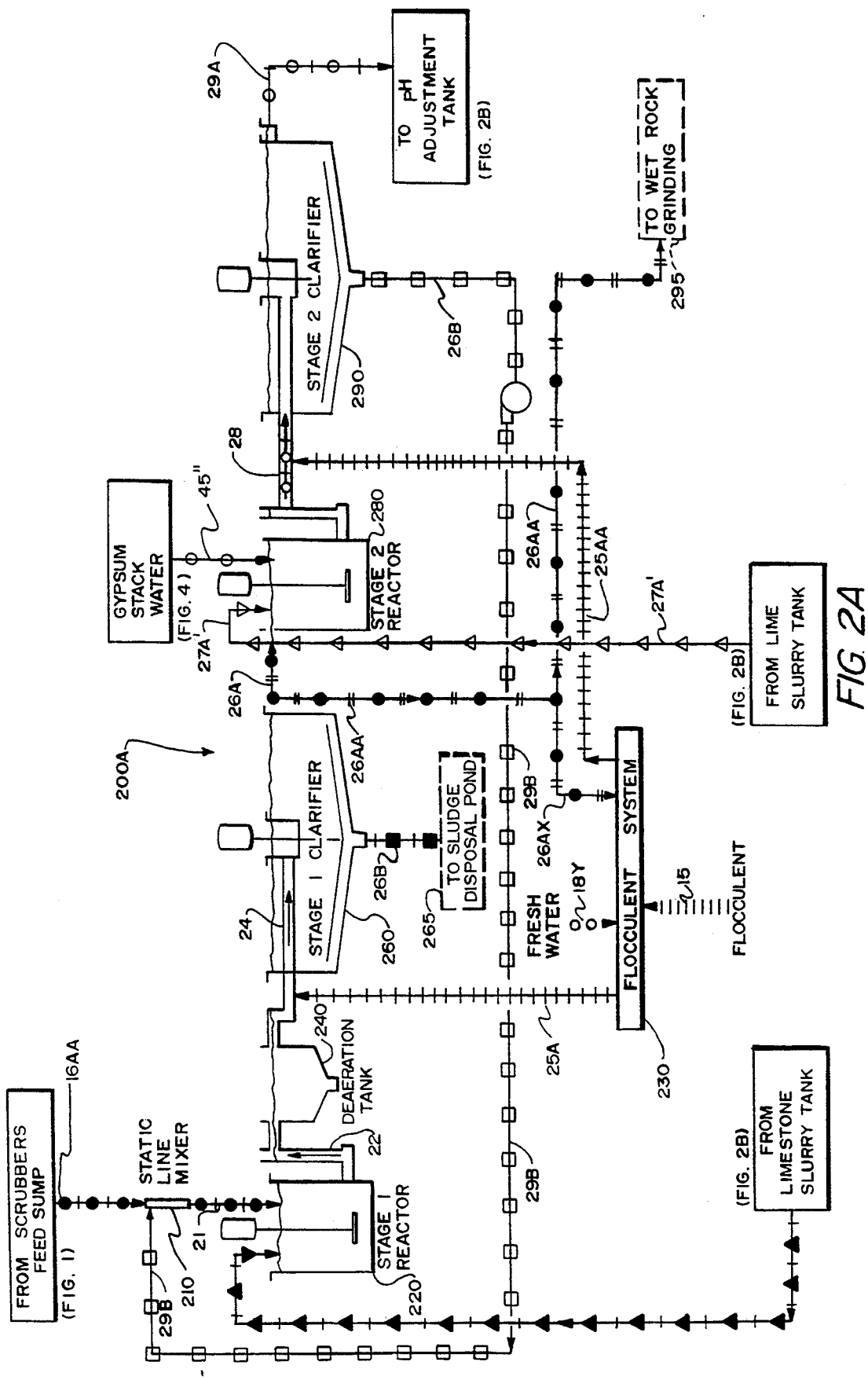
FIG. 2A is a part of a second schematic flow diagram, featuring two-stage neutralization and clarification, with scrubber process water in the first stage and gypsum stack water in the second stage, together with disposition of the respective overflow waters and underflow sludges.
Figure 3:
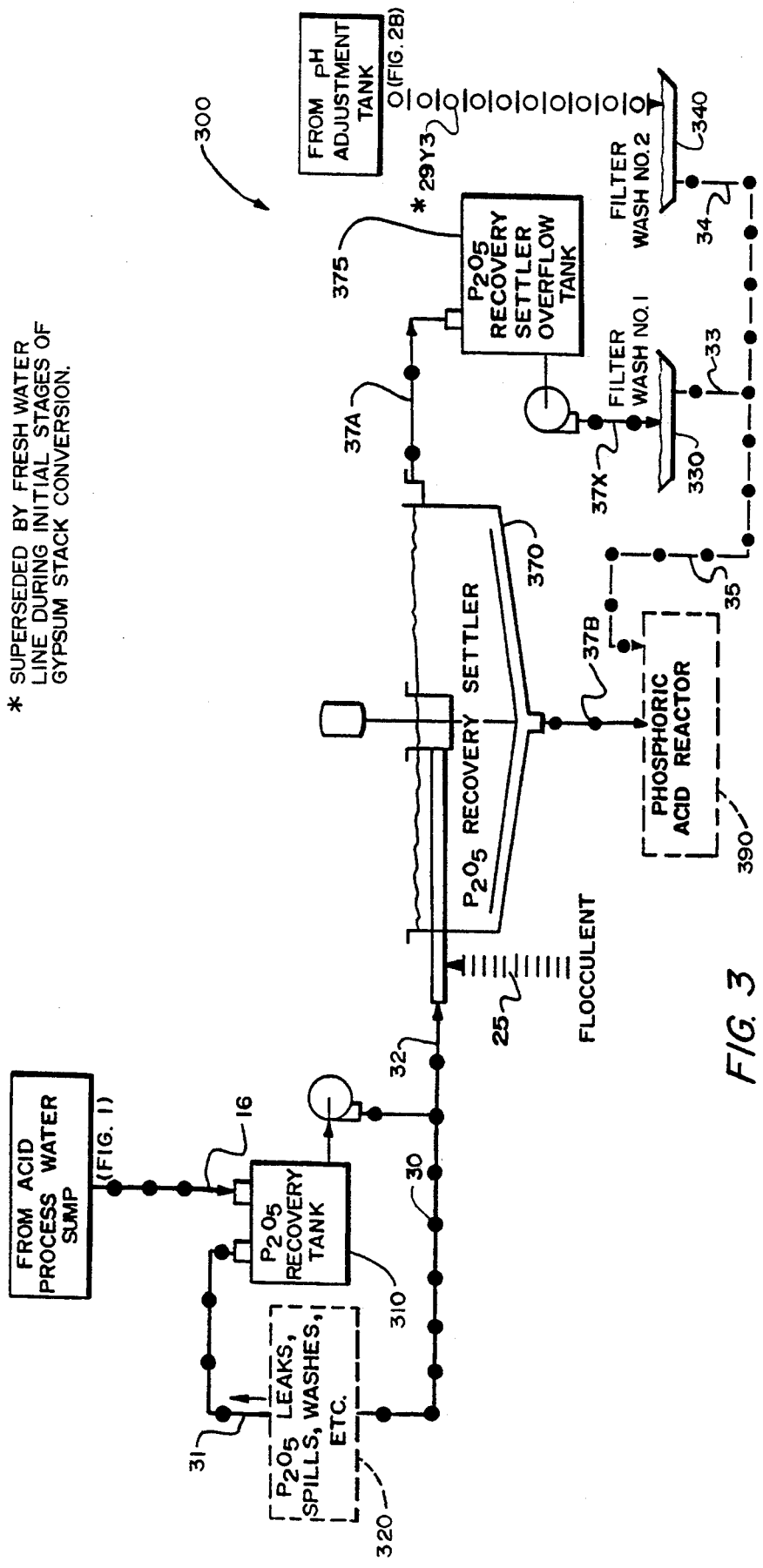
FIG. 3 is a third schematic diagram, featuring filter washes and phosphoric acid recovery.

Also in FIG. 1 a purge portion from the ACID PROCESS WATER SUMP branching from line 12 goes in part via line 16 to a $P_2O_5$ RECOVERY TANK in FIG. 3. PROCESS SCRUBBERS 160 (dashed outline as process apparatus) receive VENT GASES 105 from elsewhere in the wet-processing. Blower 145 forces scrubber gases up and out of STACK 140 (similarly outlined) and into the surrounding atmosphere. The still warm scrubber discharge water returns via line 16 to SCRUBBERS FEED SUMP 180, from which a purge line 16AA goes to the the STAGE 1 REACTOR in FIG. 2A, while most of the water is recirculated via line 16A through Scrubber Heat Exchanger 165, from which cooled scrubber process water returns to PROCESS SCRUBBERS 160 via line 16AX.

The Scrubber Heat Exchanger receives cooling water from COOLING TOWER SUMP 190 via lines 19 and 19". Warm cooling water returns via line 19X to COOLING TOWER 170. Makeup water from a pH-adjustment tank in FIG. 2B, is fed into COOLING TOWER SUMP 190 via line 29V4 on demand. Cooling water enters the top of HEAT EXCHANGERS 130 via line 19', leaves via bottom line 14, and is pumped to the top of COOLING TOWER 170, in which it is cooled by evaporation (open circles 14' with upward arrow), and from which it drains (downward arrow) to COOLING TOWER SUMP 190 and is recirculated through lines 19 and 19' to HEAT EXCHANGERS 130. Upon demand, makeup water from a pH Adjustment Tank (in FIG. 2B), is provided to the feed side of the ACID PROCESS WATER SUMP 120 via line 29V1, to the last stage of PROCESS SCRUBBERS 160 via line 29V3, and to the COOLING TOWER SUMP via line 29V4. Fresh makeup water may also be added via line 18 to the feed portion of the ACID PROCESS WATER SUMP, as during dry seasons.

Figure 2B:
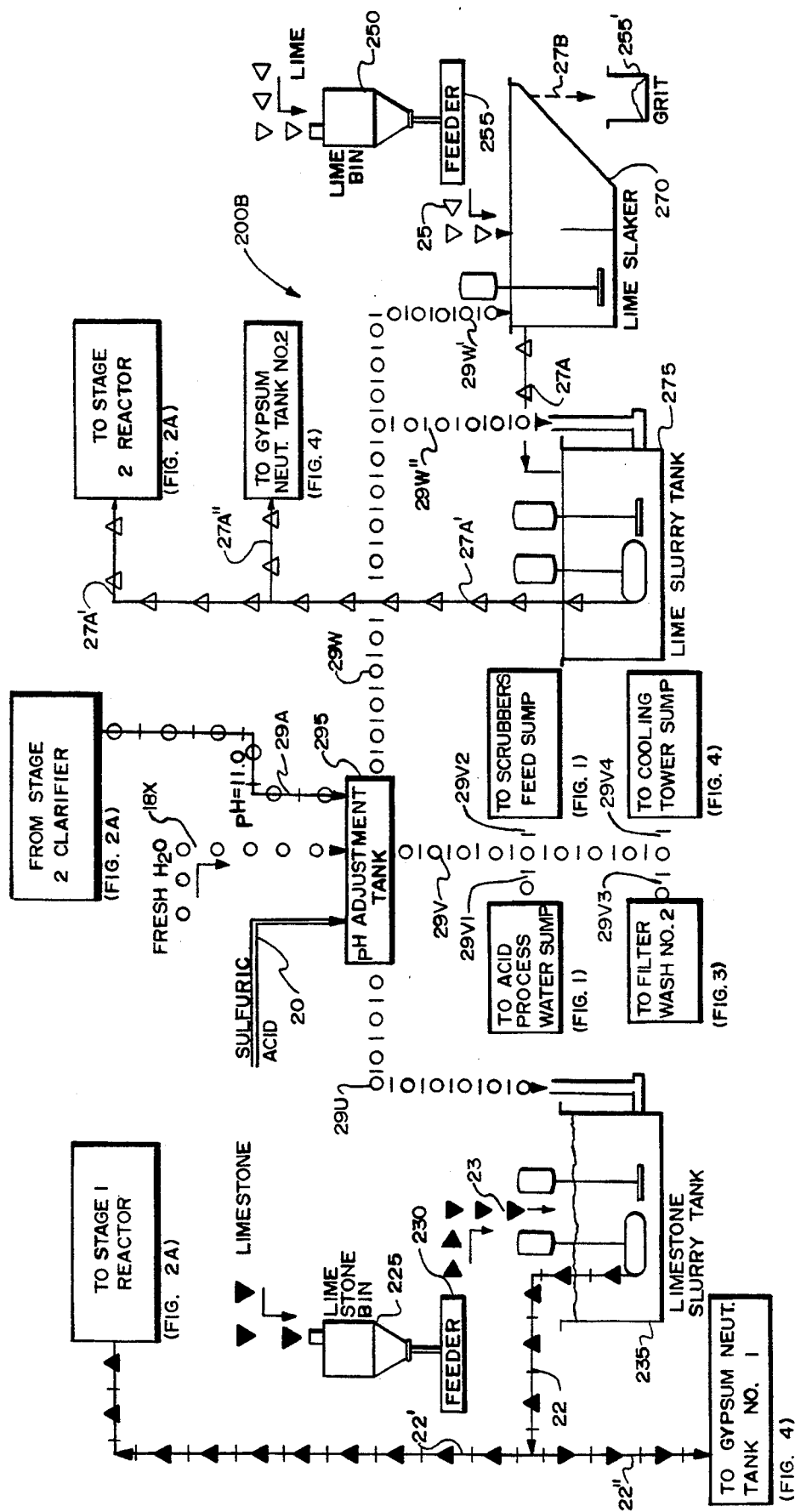
FIG. 2B is another part of such second schematic flow diagram, featuring limestone slurrying for the first stage and lime slaking and slurrying for the second stage, pH adjustment of the treated gypsum stack water, and distribution of pH-adjusted water.

FIGS. 2A and 2B show schematically a pair of second processing areas, 200A and 200B. In FIG. 2A, STAGE 1 REACTOR 220 receives via line 21 from STATIC LINE MIXER 210 Scrubber Process Water fed via line 16AA from SCRUBBERS FEED SUMP 180 in FIG. 1, and underflow slurry via line 29B from STAGE 2 CLARIFIER 290 downstream in this view. After reacting with each other, they react with limestone slurry in STAGE 1 REACTOR 220 supplied via line 22" from LIMESTONE SLURRY TANK in FIG. 2B. The STAGE 1 REACTOR contents pass via line 22 to DEAERATION TANK 240 and via line 24 to STAGE 1 CLARIFIER 260. The underflow slurry from the clarifier is forwarded via line 26B to SLUDGE DISPOSAL POND 265 located elsewhere (broken outline). Overflow from the first clarifier goes in part via line 26A to STAGE 2 REACTOR 280, and in other part via lines 26A and 26AA to WET ROCK GRINDING 295, also indicated (broken lines) as located elsewhere.

Also in FIG. 2A, FLOCCULENT is received into flocculent system 230 from an external source via line 15 (cross-hatching only), and receives initial FRESH WATER diluent via line 18Y, and is further diluted by Stage 1 clarifier overflow water via line 26AX, whereupon diluted flocculent (cross-hatched line) is fed via line 25A to STAGE 1 CLARIFIER 260, and via line 25AA to STAGE 2 CLARIFIER 290.

Gypsum stack water (from FIG. 4) is fed via line 45" to STAGE 2 REACTOR 280, in FIG. 2A, where it is mixed with overflow from STAGE 1 CLARIFIER 250 (line 26A) and reacted with lime slurry received via line 27A' and then discharged via line 28 to STAGE 2 CLARIFIER 290. The underflow slurry from STAGE 2 CLARIFIER 290 is sent via line 29B to STATIC LINE MIXER 210, where it dissolves in the acidic scrubber water entering via line 16AA, and goes via line 21 with the rest of the mixer output to STAGE 1 REACTOR 220. Resulting clear overflow alkaline or over-neutralized gypsum stack water proceeds from STAGE 2 CLARIFIER 290 via line 29A to pH ADJUSTMENT TANK 295 (in FIG. 2B), where it is joined by pH-adjusting SULFURIC ACID from line 20 before being further use.

At the left in FIG. 2B, LIMESTONE is fed into LIMESTONE BIN 225 and is discharged onto feeder 230, which forwards it via path 23 to LIMESTONE SLURRY TANK 235, into which water from pH-ADJUSTMENT TANK 295 is fed via line 29U. Almost all of the resulting limestone slurry is fed via line 22 and branch line 22' into neutralization STAGE 1 REACTOR 220 (FIG. 2A), raising the pH from below 2 to about $4\frac{1}{2}$, while the rest is forwarded via branch line 22" to GYPSUM NEUTRALIZATION TANK NO. 1 (420), FIG. 4. LIME fed (at right) into LIME BIN 250 and via FEEDER 255 and path 25 to LIME SLAKER 270, where it is slaked with pH-adjusted water from line 29W' branched from line 29W. Accumulated grit is removed via line 27B to grit collector 255' to prevent equipment degradation. Lime slurry from the LIME SLAKER 270 overflows via line 27A into LIME SLURRY TANK 275, where it is diluted with pH-adjusted water via branch line 29W". The resulting diluted lime slurry is fed via line 27A' to STAGE 2 REACTOR 280 (FIG. 2A) and branch 27A" to a GYPSUM NEUTRALIZATION TANK IN FIG. 4.

In pH ADJUSTMENT TANK 295, the pH of the over-neutralized Gypsum Stack Water received from the Stage 2 Clarifier of FIG. 2A at a pH of about 11 is fed into pH ADJUSTMENT TANK 295, where by addition of Sulfuric Acid the pH is reduced, preferably to a slightly acidic pH of about 6 (nearly neutral). The output pH-Adjusted Water is then used as non-scaling process water in FIG. 1, such as make-up to the acid process water sump via line 29V1, make-up to the scrubber feed sump via line 29V3, and make-up to the cooling tower via line 29V4. Another use for the pH-Adjusted Water is via line 29V2 in Filter Wash No. 2 (FIG. 3). Uses in limestone slurrying and lime slaking and slurrying have been already mentioned in description of this view (FIG. 2B). Fresh water is added via line 18X to pH ADJUSTMENT TANK 295 as for dry-season water balance.

FIG. 3 shows schematically a third processing area, 300, featuring $P_2O_5$ recovery. Warm acid process water from ACID PROCESS WATER SUMP 120 of FIG. 1 is fed via line 16 into $P_2O_5$ RECOVERY TANK 310. Overflow from the tank is circulated via line 30 for use on LEAKS, SPILLS, WASHES, ETC. 320 elsewhere. The resulting collected water is fed via line 31 to $P_2O_5$ RECOVERY TANK 310, and via line 32 to $P_2O_5$ RECOVERY SETTLER 370, which receives Flocculent via line 15' and overflows via line 37A to P20, RECOVERY SETTLER OVERFLOW TANK 375. The underflow slurry is fed via line 37B to process PHOSPHORIC ACID REACTOR 390 (shown in dashed outline). Two FILTER WASH steps are shown, the first performed with warm acid process water from $P_2O_5$ RECOVERY SETTLER 370 via line 37X, and the second with pH-adjusted process water via line 29V3 from the pH-Adjustment Tank (FIG. 2B). Wash water from FILTER WASH NO. 1 (330) via line 33, and from FILTER WASH NO. 2 (340) via line 34, combine in line 35 to PHOSPHORIC ACID REACTOR 390 for dissolved $P_2O_5$ recovery.

Figure 4:
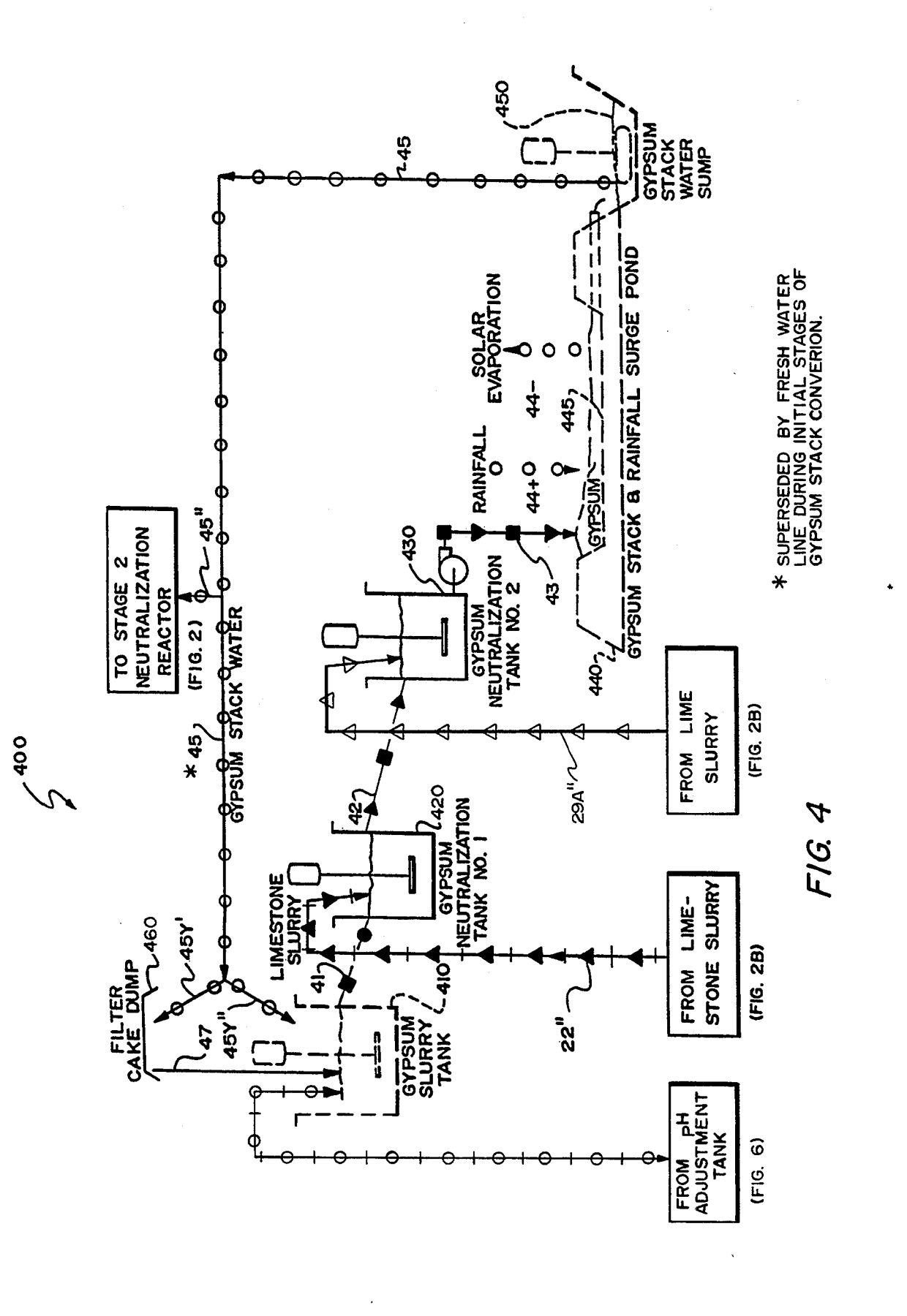

FIG. 4 shows schematically a fourth processing area, 400, with a gypsum stack and a rainfall surge pond as usual in wet-process phosphoric acid manufacturing but now with important distinctions. Gypsum filter cakes from the plant's FILTER CAKE DUMP 460 via path 47 and recirculated gypsum stack water from GYPSUM STACK WATER SUMP 450 (shown in dashed outline) via sluice line 45Y' and slurry line Y" are mixed together in GYPSUM SLURRY TANK 410 (also in dashed outline). Resulting gypsum slurry proceeds to GYPSUM NEUTRALIZATION TANK NO. 1 (420), which receives LIMESTONE SLURRY via line 22" from the LIMESTONE SLURRY TANK in FIG. 2B. The reacted mixture then overflows via line 42 into GYPSUM NEUTRALIZATION TANK NO. 2 (430), where it is further stabilized. Lime slurry may also be added to increase the pH, if desired, via line 29A". From the last tank in FIG. 4, the resulting neutralized gypsum is spread via path 43 onto GYPSUM STACK 440, with adjacent RAINFALL SURGE POND 445. Both stack and pond receive water as RAINFALL (44+) and lose water to SOLAR EVAPORATION (44−). Overflow from the surge pond gathers in GYPSUM STACK WATER SUMP 450 and is recirculated via line 45 to sluicing gypsum cakes in FILTER CAKE DUMP 460 via branch line 45Y' and directly into GYPSUM SLURRY TANK 410 via branch line 45Y". Excess water from cake slurrying goes via line 45" to STAGE 2 REACTOR 280 (FIG. 2).

Phosphoric acid process waters generation, use, and treatment according to this improvement are readily understood from the accompanying diagrams and their foregoing description in the light of the operational information given below. Prominent flow paths or circuits are recapitulated, with appropriate comment about conditions prevailing, or changes occurring, at various locations and times. It will be understood that such combinations of two or more of such circuits, and of most or all of them together, is more than a mere aggregation of individual parts or steps, even though one or more of them may be familiar to persons ordinarily skilled in the art.

Acid process water and scrubber water and other makeup waters start with pH-adjusted water (pH-AW). This is a pure water prepared by treating gypsum pond water—itself obtained from filter cake water neutralized with limestone to a pH of about 4.5 (plus rainwater, or dry-season fresh water)—with lime in the second-stage reactor to a pH of about 11, clarifying it, and adjusting the pH of the resulting clear overflow to about 6, as with sulfuric acid. This pH-AW is non-scaling and very low in impurities, such as about 2 ppm fluorides, 23 ppm $P_2O_5$, 97 ppm calcium, 25 ppm silicon dioxide and 500 ppm total dissolved solids.

Acid process water (APW) is generated from pH-AW and is totally used for its intended purpose, as a once-through water, used for process makeup water in the wet-process phosphoric acid plant while simultaneously recovering most of the miscellaneous losses that occur in conventional processing.

In the APW condenser circuit, pH-AW is added to a circulating flow of APW. Steam from flash coolers and evaporators of a wet-process acid plant is condensed with circulating APW at about 35° C. (95° F.), thereby warming to about 50°–55° C. (about 85°–120° F.). The warm water is cooled in heat exchangers by a separate isolated circuit of cooling water recirculating from there to a cooling tower and back within a range of about 30° C. to about 50° C. (about 85° to 120°–125° F.). Cooling tower makeup water is pH-AW, non-scaling and compatible with cooling towers designed for fresh water use.

The APW absorbs substantially all gaseous fluorides evolved by the flash coolers and evaporators, as well as collecting entrained phosphoric acid. Concentrations are usually in the range of about a half dozen to about one and one-half dozen (averaging about a dozen) parts per thousand of fluorides (F) and a like amount of $P_2O_5$. A purge stream from the APW sump tank precludes accumulation above such concentrations—and is sent to the $P_2O_5$ recovery tank. APW in the tank is circulated to plant areas to recover $P_2O_5$ from spills and leaks, and is used for washdowns. A purge stream is withdrawn and is sent to the $P_2O_5$ recovery settler for removal of suspended solids to prevent blinding of the filter cake when washed with APW. Solids-free APW is used for the first filter cake wash to provide about 60% of the process makeup water to the process and, in so doing, to recover about 80–85% of the miscellaneous $P_2O_5$ losses to the process. In contrast, conventional operations use acid pond waters, used to slurry the gypsum, present in the moisture in the gypsum deposited in the gypsum stack, and thereby lost to the process. APW is very acidic, not having been treated with limestone or other neutralizing agent, and is non-scaling. In addition to increasing $P_2O_5$ recovery, the fluosilicic acid in the APW going into the phosphoric acid reactor will react with the phosphate rock to produce phosphoric acid, removing the fluorides by precipitation, and saving on sulfuric acid usage.

Scrubber water is generated from pH-AW and totally used for its intended purpose, as a once-through water. The pH-AW is introduced into the last stage of the scrubbers and, by circulating around the process scrubbers, substantially absorbs all the gaseous fluorides—$P_2O_5$ content is negligible, especially in modern plants with wet-rock grinding. The scrubber heat exchanger, using cooling tower water, cools the scrubber water from about 100° F. to 95° F. for more efficient scrubbing. The recirculated scrubber rate to the scrubber is on the order of several dozen gal per thousand cubic feet of gas. The fluoride content ranges from several to more than a dozen parts per thousand, depending upon the phosphate rock used, the manner in which the filter recycle acid and sulfuric acid are fed to the reactor, and the process used (i.e., dihydrate or hemihydrate). A purge stream is used to control fluoride concentration and is sent to the first-stage reactor for removal of fluorides.

Here gypsum filter cakes from phosphoric acid plant operations undergo a first wash (with warm APW) as noted. The first filter wash volume approaches about 1.4 displacements of the filter cake water. The second wash of filter cake wash is performed with clear non-scaling pH-AW, wherein about one displacement wash volume of the filter cake water is effective to remove APW in the filter cake, thereby improving $P_2O_5$ recovery. The water from both of the washes is returned to the plant phosphoric acid reactor for $P_2O_5$ recovery, whereas the washed filter cake proceeds into the gypsum slurry tank. Approximately one percent of water-soluble $P_2O_5$ (lost in gypsum filter cake in the conventional phosphoric acid wet-process) is non-recoverable regardless of steps taken to reduce the loss further.

Also fed to the gypsum slurry tank is gypsum stack water for slurrying the cake and washing the cake from the filter. The slurry from the gypsum slurry tank is thoroughly mixed and then is passed to the first gypsum neutralization tank, into which limestone slurry is fed from the limestone slurry tank to raise the pH to about 4.5, thereby precipitating fluorides, along with about 30–40% of the phosphates, and most of the heavy metals, and radium-226. This largely neutralizes weak acids in the gypsum, and the overflow proceeds to a second gypsum neutralization tank for stabilization time to complete the reaction so as to minimize build-up in the pipelines to the gypsum stack. As noted, lime slurry may be added to increase the pH.

The partly neutralized gypsum slurry is spread on the gypsum stack and so dewatered. Water drains from the gypsum stack into an adjoining rainfall surge pond, which increases in level thereby and from rainfall as it occurs. The surge pond also loses water by evaporation. A gypsum stack water sump receives the partially neutralized gypsum stack water (and rainfall) from the rainfall surge pond. The gypsum stack water from the sump is recirculated to the gypsum slurry tank and to the second-stage reactor for neutralization therein.

The partially neutralized gypsum stack water is distinguished from the usual gypsum stack pond water by its higher pH and substantial lack of phosphoric (and other) acid and of dissolved fluorides, as noted. Extensive (e.g., several-hundred-acre) conventional acid pond water cooling ponds, as now used with acid pond water in direct contact with the ground, are no longer environmentally acceptable and by the present invention are superseded. Some area will be required for a rainfall surge pond, which would contain partially neutralized gypsum stack water instead of low-pH pond water.

The described improvement is balanced so that no material accumulates to excess and no required material depletes excessively. The operating cost is not penalized in achieving drastically increased environmental acceptability and actually is reduced through increased recovery of $P_2O_5$ and correspondingly decreased containment requirement for acids, heavy metals and radioactive compounds.

The present invention applies such improvement to an existing wet-process phosphoric acid operation with existing gypsum stack and acid water pond. Presumably, as soon as the treatment apparatus already described is in place at the location of a pre-existing wet-process phosphoric acid plant, such treatment will be initiated, preferably with a new gypsum stack. However, the existing gypsum stack continues to drain into the existing acid water cooling pond, and both remain a source of environmental contamination.

The conversion/transition procedure undertakes to rehabilitate the existing gypsum stack by discontinuing use of acid pond water in slurrying the gypsum, and by substituting partially neutralized gypsum stack water having a pH of about 4.5 in such use. This greatly reduces ground water contamination and gaseous fluoride emissions by drastically decreasing the level of fluorides and phosphates, heavy metals, and radioactive compounds soluble in low-pH acid pond water.

Figure 5A:
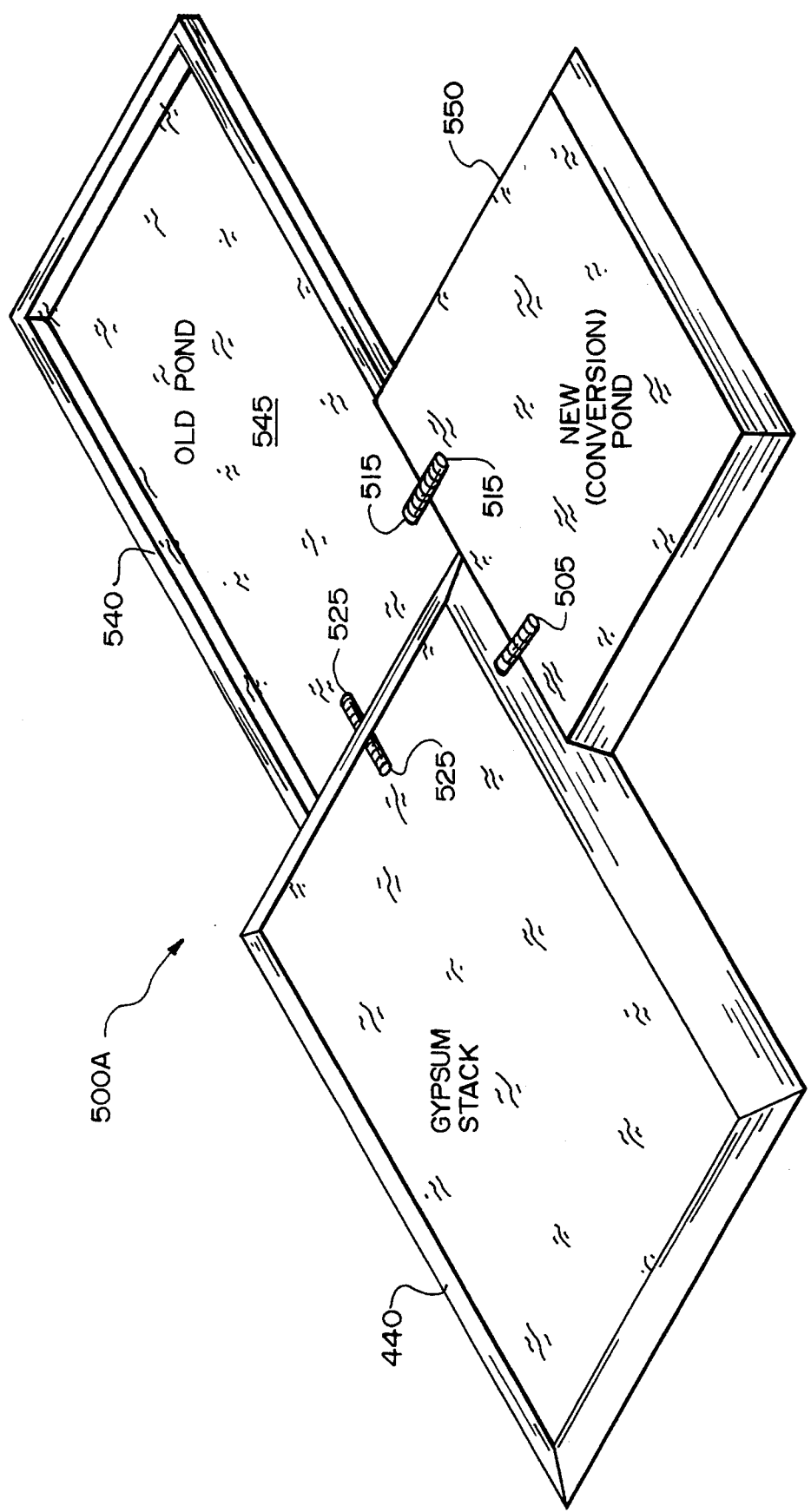
FIG. 5A is an isometric view of an arrangement of gypsum stack and pond areas used in transitioning operations by this invention.
Figure 5B:
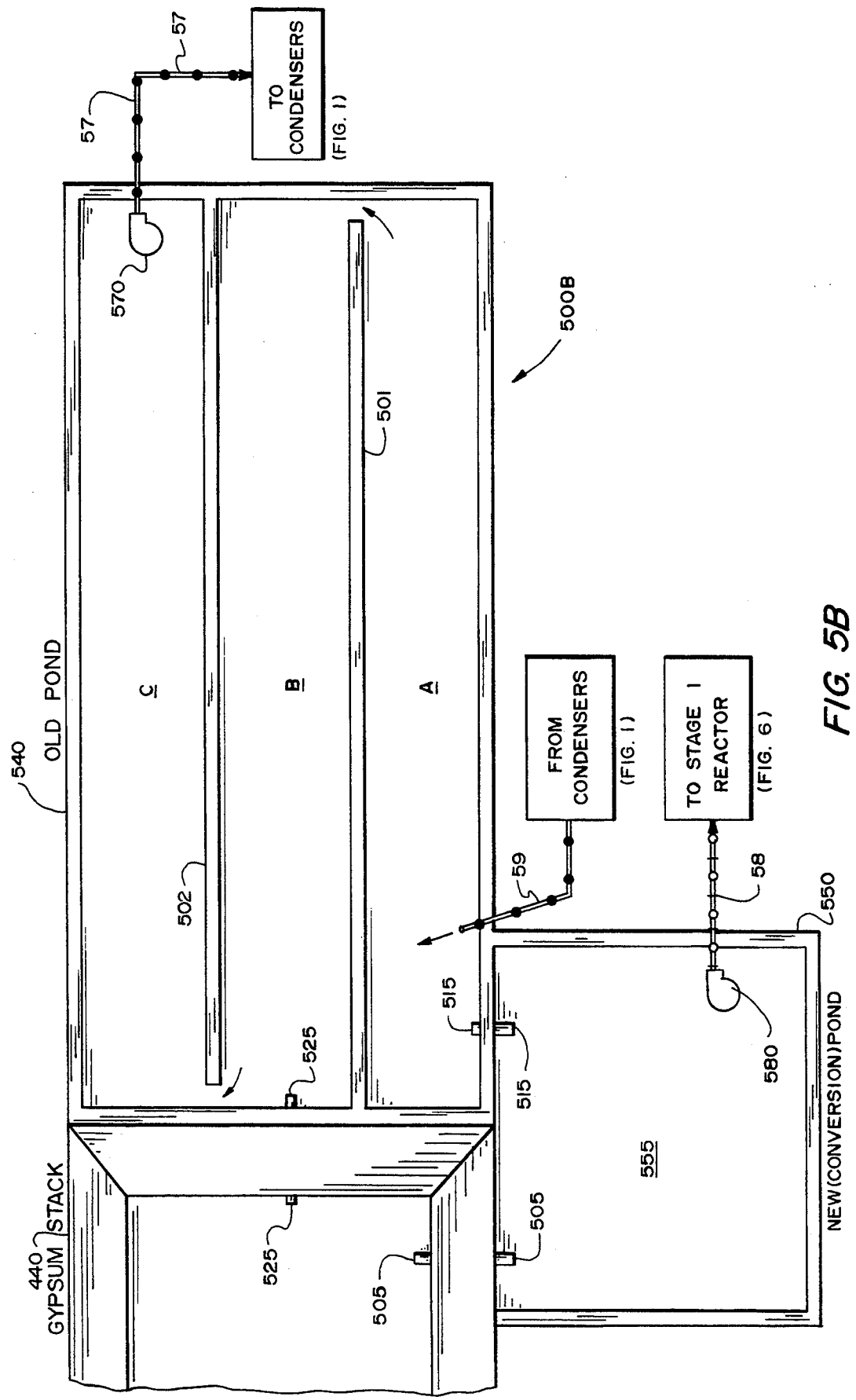
FIG. 5B is a plan view of the storage areas of FIG. 5A.

FIGS. 5A and 5B show the conversion or transition area, first in perspective as 500A, schematically rather than realistically, and then fragmentarily in plan as 500B (in somewhat different detail).

FIG. 5A shows (left) area 500A, with pre-existing GYPSUM STACK 440 and with adjacent pre-existing OLD (collection) POND 540, which also functions as a RAINFALL SURGE POND and conventionally contains ACID POND WATER 545. Adjacent is smaller NEW (conversion) POND 550 constructed especially to contain GYPSUM STACK WATER 555 for the transition. Such NEW POND is empty at the beginning of the transition period, and is connected to the GYPSUM STACK by pipe 505 and to the OLD POND by pipe 515, whereas pipe 525 connects those other two together. Though indicated schematically as pipes, any of these connectors may include or be supplemented by underflow pipes or by adjustable means to aid or limit discharge, such as an inflow pump (either direction) or an outflow gate, valve, weir, etc. The relative pond heights are only imperfectly suggested in such a view.

Actually the gypsum stack is usually several times as high as the walls of the separate ponds, say 15 meters (50 feet) compared with about 3 m (10 ft) for old ponds and 4.5 m (15 ft) for new ponds.

FIG. 5B shows area 500B, with GYPSUM STACK 440 (fragmentarily) and the ponds of FIG. 5A in plan and in enhanced detail. OLD POND 540 is divided into thirds (A, B, C) by two longitudinal baffles 501 and 502, each open at one end to provide an S-like continuity to the body of water therein. The OLD POND has Condenser Pump(s) 570 at its far end to supply pond water to CONDENSERS 110 (FIG. 1), while warm water from the CONDENSERS is returned to the OLD POND's near end via line 59. Pump 580 in NEW POND 550 pumps water 555 therefrom to STAGE 1 REACTOR in FIG. 6 (described further below). The NEW POND is fed by gravity with run-off from the GYPSUM STACK via overflow pipe 505, and should have the capacity to accommodate a whole day's (24 hrs) normal run-off. The water level in the NEW POND is intended to be higher than the water level in the OLD POND, so water received from the GYP- SUM STACK via pipe 505 overflows via discharge pipe 515 from the OLD POND into the NEW POND. Excessive rainfall may drain from the GYPSUM STACK into the OLD POND VIA PIPE 525.

At the start of the conversion, the phosphoric acid plant with its existing gypsum slurry system is shut down for a few days to let the water level in the gypsum stack drop to a minimum. During this period, the acid pond water remaining in the GYPSUM STACK is valved to drain directly to the OLD POND via the connecting overflow pipe. After such interruption interval, the phosphoric acid plant is restarted. For a preliminary period determined as indicated below fresh water is used to slurry the gypsum and to wash filter cake, and overflow from the GYPSUM STACK is directed to the OLD POND, while the NEW POND is still maintained empty. The concentrations of fluorides and $P_2O_5$ are monitored and as soon as they have dropped to a reasonably steady state (or in the event that the run-off from the gypsum stack becomes abnormally low) the run-off is re-directed to the NEW POND, and overflow pipe 525 from the SURGE POND to the OLD POND is closed. When the water in the NEW POND rises to an operating level, the aforementioned preliminary fresh-water use is discontinued, and the water is recycled from the NEW POND by pump 580. Seepage from the GYPSUM STACK to the OLD POND through underdrains (not shown) either directly or via seepage ditches (also not shown) continues at its own much slower pace until discontinued.

The recycled water must be treated to remove acid values and other contaminants until the gypsum stack water reaches the desired pH of about 4.5. Recycling to and through the FIG. 2A two-stage neutralization system has disadvantages—such as contaminating the process water of this invention with ammonium ions ($NH_4^+$)—that the preferred recycling (for the duration of the transition) is via a separate but similar two-stage neutralization system.

Figure 6:
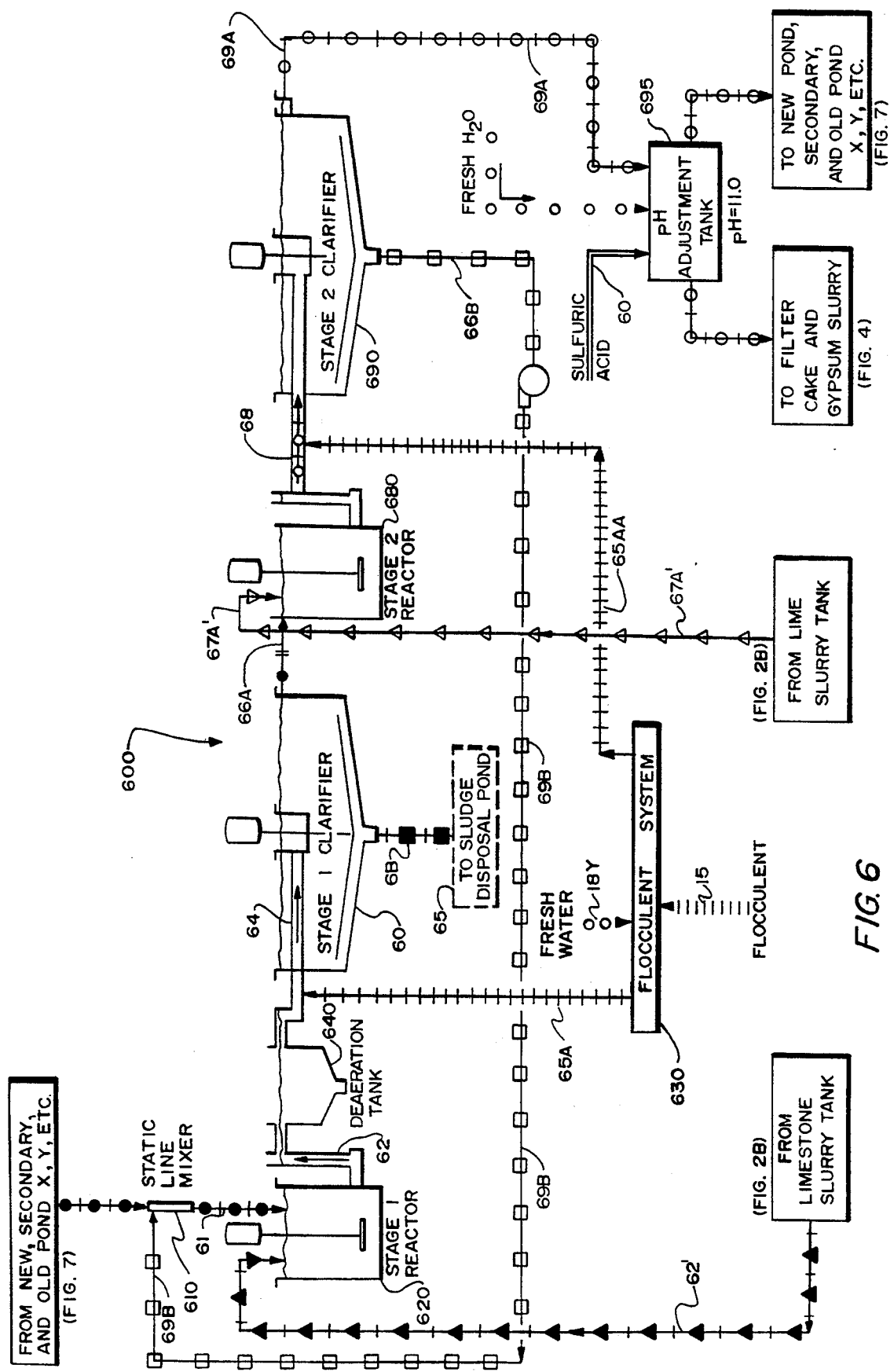
FIG. 6 is a schematic diagram of a neutralization area.

FIG. 6 shows two-stage neutralization area 600, conveniently like the corresponding two-stage system of U.S. Pat. No. 4,320,012. It also resembles that of FIG. 2A—except for 6 instead of 2 as initial digit of its reference numerals—that its description here can be minimized. The input water (upper left corner) comes from the NEW POND via line 58, and output pH-adjusted water or pH-AW goes (lower right corner) to GYPSUM SLURRY TANK 420 in FIG. 4 at this stage.

The solids precipitated in STAGE 1 REACTOR 620 at a pH of about 4.5 are settled in STAGE 1 CLARIFIER 660, and the underflow containing them is sent to a sludge pond located elsewhere. Overflow from the same clarifier is treated with lime in STAGE 2 REACTOR 680 to a pH of about 11, thereby removing most of the remaining fluorides, phosphate, heavy metals and radioactive contaminants. When the pond water is treated with lime or limestone, the silica in fluosilicic acid changes to a gelatinous hydrated form starting at a pH of about 2.5 and the reaction rate increases by several orders of magnitude at a pH of 7. The silica is removed by precipitation at a pH of about 11 into underflow of STAGE 2 CLARIFIER 690 and is returned to the STAGE 1 REACTOR via line 29B to STATIC LINE MIXER 610 into the STAGE 1 REACTOR and on into the STAGE 1 CLARIFIER, from which it is removed in the underflow to the sludge disposal site.

Overflow water from the STAGE 2 CLARIFIER at a pH of about 11 is treated with sulfuric acid to an environmental pH of about 6, for discharge to natural waters except for whatever quantity of pH-AW is used in slurrying the gypsum and in washing the filter cake.

Now neutralization of the slurry from GYPSUM SLURRY TANK 410 (FIG. 4) to a pH of about 4.5 with limestone is resumed, as already described hereinabove. Operation continues in this manner until the pH of the water from the NEW POND nears a pH of 4.5—perhaps several months or even a year or more. Once the return water from the NEW POND reaches such level, separate treatment of such water is discontinued, and plant operations can follow the improved method of this invention previously described, so the conversion of the plant from the previous conventional phosphoric acid process is complete.

The final step is treatment of acid waters impounded in the OLD POND in the added two-stage neutralization of FIG. 6. Doing so is facilitated by addition of a small secondary conversion pond.

Figure 7:
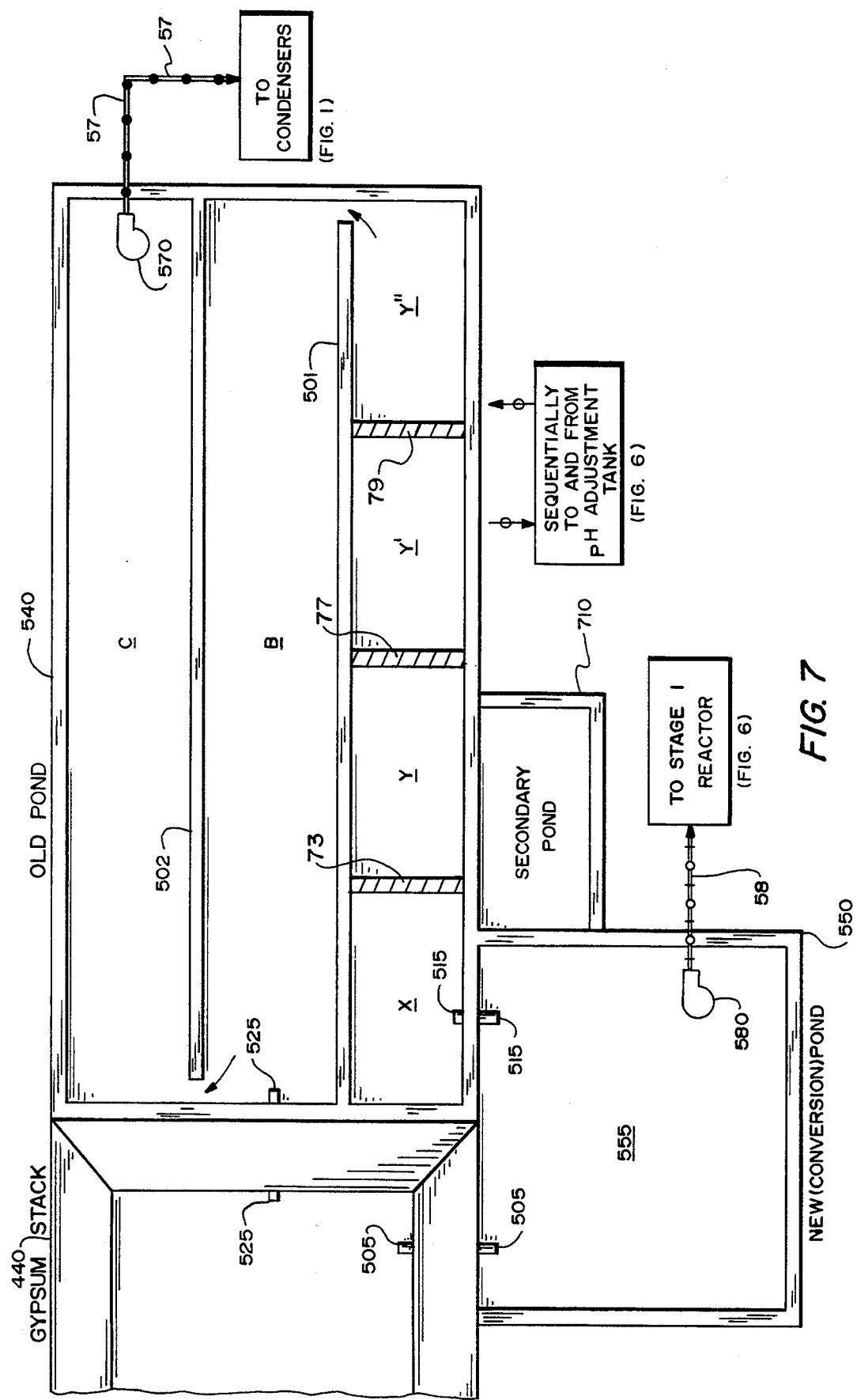
FIG. 7 is a view similar to FIG. 5B but with the old acid water pond schematically subdivided into a series of compartments so as to enable conversion to environmentally safe waters of this invention.

FIG. 7 shows, in plan, area 700, which includes area 500B of FIG. 5B plus added SECONDARY POND 710 (initially empty). Former area A (see FIG. 5B) of OLD POND 540 is subdivided here by temporary dams 73, 77, and 79 into four pools X, Y, Y', and Y"—each such pool having substantially the same volumetric capacity as the SECONDARY POND and, thus, as each other. Portion X is bounded by the walls of OLD POND 540, baffle 501, and dam 73; portion Y is bounded by dam 73, baffle 501, dam 77, and the pond wall; portion Y' is bounded by dam 77, baffle 501, the pond wall, and dam 79; and portion Y" is bounded by dam 79, baffle 501 (with closable gap), and the wall.

The FIG. 7 arrangement is now operated to re-process the OLD POND water through added two-stage neutralization area 600 of FIG. 6, conveniently like that of U.S. Pat. No. 4,320,012 (as already noted). The water from OLD POND pool X is pumped via a portable pump and pipe (not shown) to STAGE 1 REACTOR 630 until pool X is empty. Resulting pH-adjusted water will be returned to SECONDARY POND 710 via via pump and pipe means (not shown). While the SECONDARY POND is filling with pH-AW to be transferred to the pool X part of the OLD POND, the portable pump can be moved to pool Y, and the water in that portion of the OLD POND be pumped to and treated by the FIG. 6 two-stage neutralization process into pH-adjusted water. Meanwhile, pH-AW is discharged from the SECONDARY POND into the emptied pool-X location. If desired, dam 73 can be removed now because both X and Y pool locations are filled with pH-adjusted (nearly neutral) water. Portions Y' and Y" are so treated in succession. Of course, damming the last remaining portion in the first third of the OLD POND requires only closing the flow space at the end of baffle 501.

As each successive pool is refilled with pH-AW, it then can be combined with the combined previously treated pools by removal of the intervening temporary dam. After such treatment of the first one-third area (A) of the OLD POND, each pool portion of areas B and C is so treated in succession until of the acid gypsum pond water has been converted to decontaminated pH-adjusted water.

Completion of the rehabilitation of OLD POND acid waters should be readily carried out to completion in the manner just described, notwithstanding that doing so can be expected to take upwards of a year. Each pool portion can be undergoing conversion for a month.

Conversion can be accomplished even where a phosphate plant is operated differently from the improved process described above, or has been converted to a non-phosphoric-acid type of processing, or has been closed down and/or abandoned. Appreciable environmental benefit will result, as compared with allowing the acidic waters to continue to pollute the atmosphere and the ground and ground waters.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

What is claimed is:

1. Method of converting an existing pond of acidic gypsum pond water, resulting from conventional wet-process phosphoric acid manufacturing and containing contaminants, to nearly neutral water substantially freed of contaminants, comprising the steps of processing the water through a two-stage neutralization and clarification system, including neutralizing the water to a pH of about 4.5 in a first stage and clarifying it, wherein contaminants insoluble at that pH are removed by precipitation, then alkalizing the clarified water to a pH of about 10.5 to 12 in a second stage and further clarifying it, wherein contaminants insoluble at the latter pH though previously soluble are removed by precipitation, and then acidifying the further clarified water and thereby providing a pond of pH-adjusted water (pH-AW) substantially free of contaminants; and including subdividing the existing pond into a manageable number of separate but equal volumes, establishing a secondary pond initially empty and with a volume at least as large as the separate but equal volume, transferring the acidic water from an arbitrarily selected first of successive separate but equal volumes of water from the existing pond into the new secondary pond, processing the transferred water through said two stages of pH increase and said subsequent acidification to pH-AW, and back into said first still separate but equal volume of the existing pond.

2. Method according to claim 1, including similarly treating the successive volumes of water from the existing pond, and combining the volumes of water so treated together with one another but apart from any water remaining untransferred in the existing pond.

3. Method according to claim 1, including so treating each additional equal volume of water from the existing pond until all of the water in the existing pond has been so treated and combined.

4. Method of treating a pond of existing acid gypsum pond water from wet-process phosphoric acid manufacturing, containing phosphoric acid and having a pH of at most about 2 and containing contaminants from the group consisting of fluorine, heavy metal, silicon, and radioactive compositions, positions, by substantially removing the named contaminants and by minimizing residual phosphoric acid, comprising the steps of partially neutralizing the acid gypsum pond water to a pH about midway between 2 and a neutral 7, thereby precipitating therefrom those of the identified compositions that are insoluble at that pH, removing the precipitated compositions in the underflow, thereby clarifying the water, alkalizing the clarified partially neutralized water to a pH between about 10.5 and 12, thereby precipitating therefrom those previously soluble identified compositions that are insoluble at the pH resulting from alkalization, removing the precipitated compositions in the underflow, thus further clarifying the water, and re-acidifying the clarified alkalized water to a nearly neutral pH between about 6 and 7 to yield a pond of pH-adjusted process water (pH-AW);

performed stepwise upon the water of an existing gypsum pond, including the steps of subdividing the existing pond into a number of substantially equal volumes adapted to be separated from one another therein, also establishing a new secondary pond having an initially empty volume at least as large as the aforesaid equal volume, transferring the acidic water from a first of the equal volumes of the existing pond into the new secondary pond, processing such water through the stages of partial neutralization and alkalization, each stage including clarification, and through re-acidification to pH-AW, thence returned to said first volume of the existing pond, separate and apart from the other volumes of water in the existing pond.

5. Treatment method according to claim 4, including steps of successively so treating additional separate but equal volumes of water from the existing pond, and combining the successive volumes of water so treated together with one another, separate and apart from whatever volume(s) of untreated water may remain in the existing pond.

6. Treatment method according to claim 5, and completing the conversion of the entire volume of existing pond water into pH-AW.

7. Treatment method according to claim 6, including forming a conversion pond adapted to receive gypsum stack drainage during and after the treatment of the existing pond acid pond waters.

* * * * *

UNITED STATES PATENT AND TRADEMARK OFFICE
CERTIFICATE OF CORRECTION

PATENT NO. : 5,366,640
DATED : Nov. 22 1994
INVENTOR(S) : Gordon F. Palm and R. George Hartig It is certified that error appears in the above-indentified patent and that said Letters Patent is hereby corrected as shown below:

Column 14, line 6, delete -- positions, --.

Signed and Sealed this

Eighteenth Day of July, 1995

Attest:

BRUCE LEHMAN

Attesting Officer

Commissioner of Patents and Trademarks